United States Patent [19]

de Meulemeester

[11] 4,157,196

[45] Jun. 5, 1979

[54] HYDRAULIC COUPLING DEVICE

[75] Inventor: Jean C. de Meulemeester, Fontainebleau, France

[73] Assignee: FMC Corporation, San Jose, Calif.

[21] Appl. No.: 832,772

[22] Filed: Sep. 13, 1977

[30] Foreign Application Priority Data

Sep. 13, 1976 [FR] France .................................. 76 27459

[51] Int. Cl.² .............................................. F16L 55/00
[52] U.S. Cl. ........................................ 285/18; 285/24; 285/406
[58] Field of Search .................... 285/18, 24, 27, 364, 285/420, 406, DIG. 21

[56] References Cited

U.S. PATENT DOCUMENTS

| 3,473,830 | 10/1969 | Haley | 285/24 |
| 3,489,434 | 1/1970 | Haley | 285/27 X |
| 3,498,325 | 3/1970 | Ashton et al. | 285/420 X |
| 3,586,350 | 6/1971 | Aston | 285/24 |
| 3,661,408 | 4/1970 | Gibbons | 285/18 |
| 3,830,533 | 8/1974 | Mezei et al. | 285/364 |

FOREIGN PATENT DOCUMENTS 1395928 5/1975 United Kingdom ..................... 285/364

Primary Examiner—Mervin Stein
Assistant Examiner—Carl Pietruszka
Attorney, Agent, or Firm—Lloyd B. Guernsey; W. William Ritt, Jr.

[57] ABSTRACT

A hydraulic coupling device for drawing and connecting two pipe flanges together, comprising a pair of clamps one of which is adapted for bolting the coupling device to one of the pipe flanges, and the other of which is movable towards and away from the first clamp by actuation of a hydraulic motor. An externally threaded spindle is connected to the motor and extends through an internally threaded bore in a sleeve on which the movable clamp is mounted, so that actuation of the motor causes the sleeve and movable clamp to slide lengthwise in the body bore as the spindle rotates. When the motor is reversed, the movable clamp swings radially away from the pipe to facilitate disconnecting the two pipe flanges. The coupling device also includes a hydraulic bypass switch to disable the hydraulic motor when the movable clamp arrives at a predetermined position.

7 Claims, 4 Drawing Figures

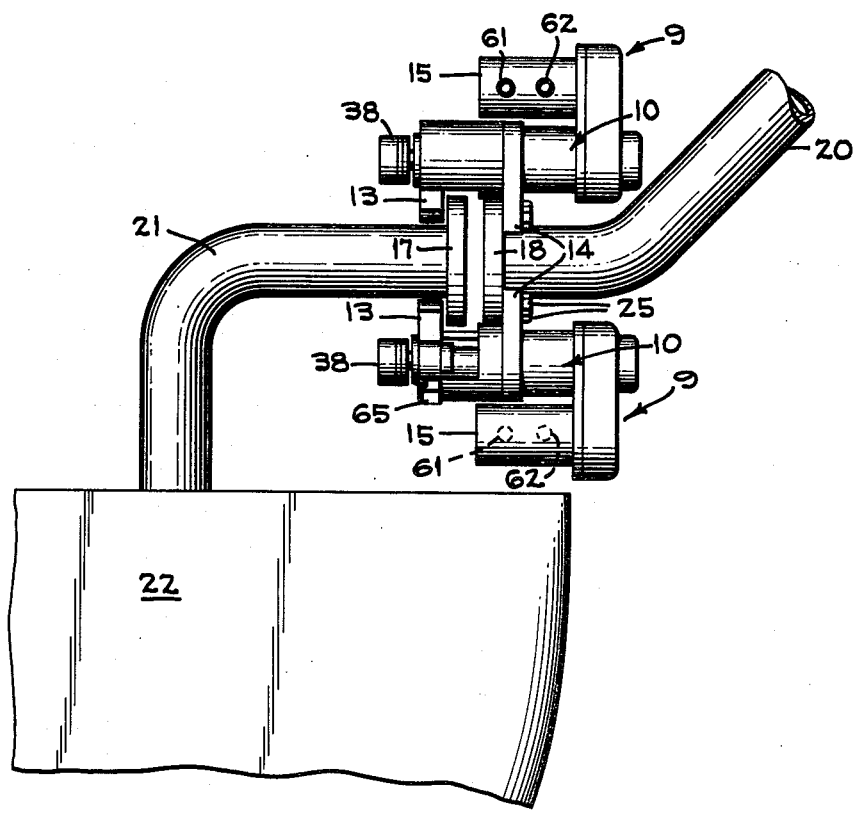
FIG_1
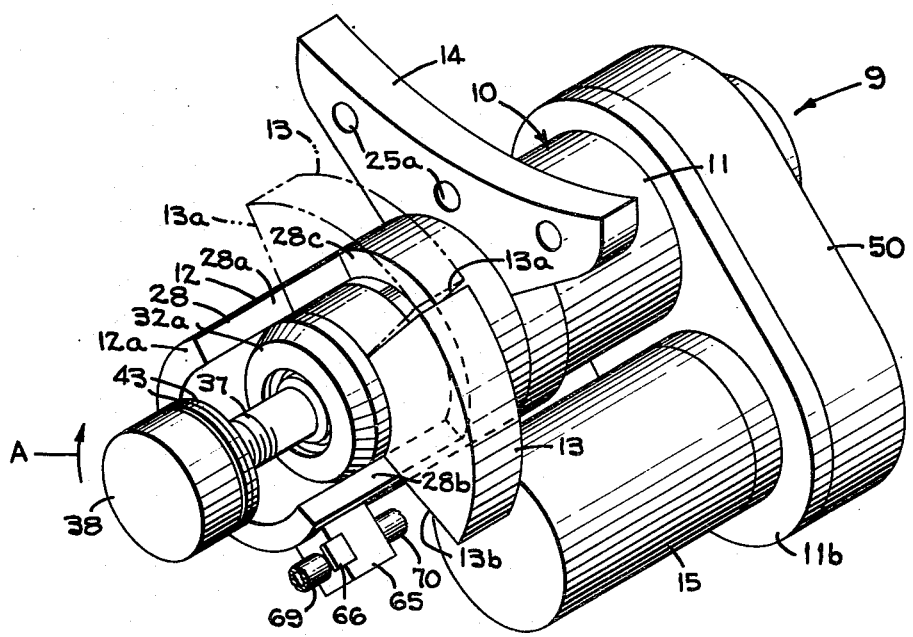
FIG_2

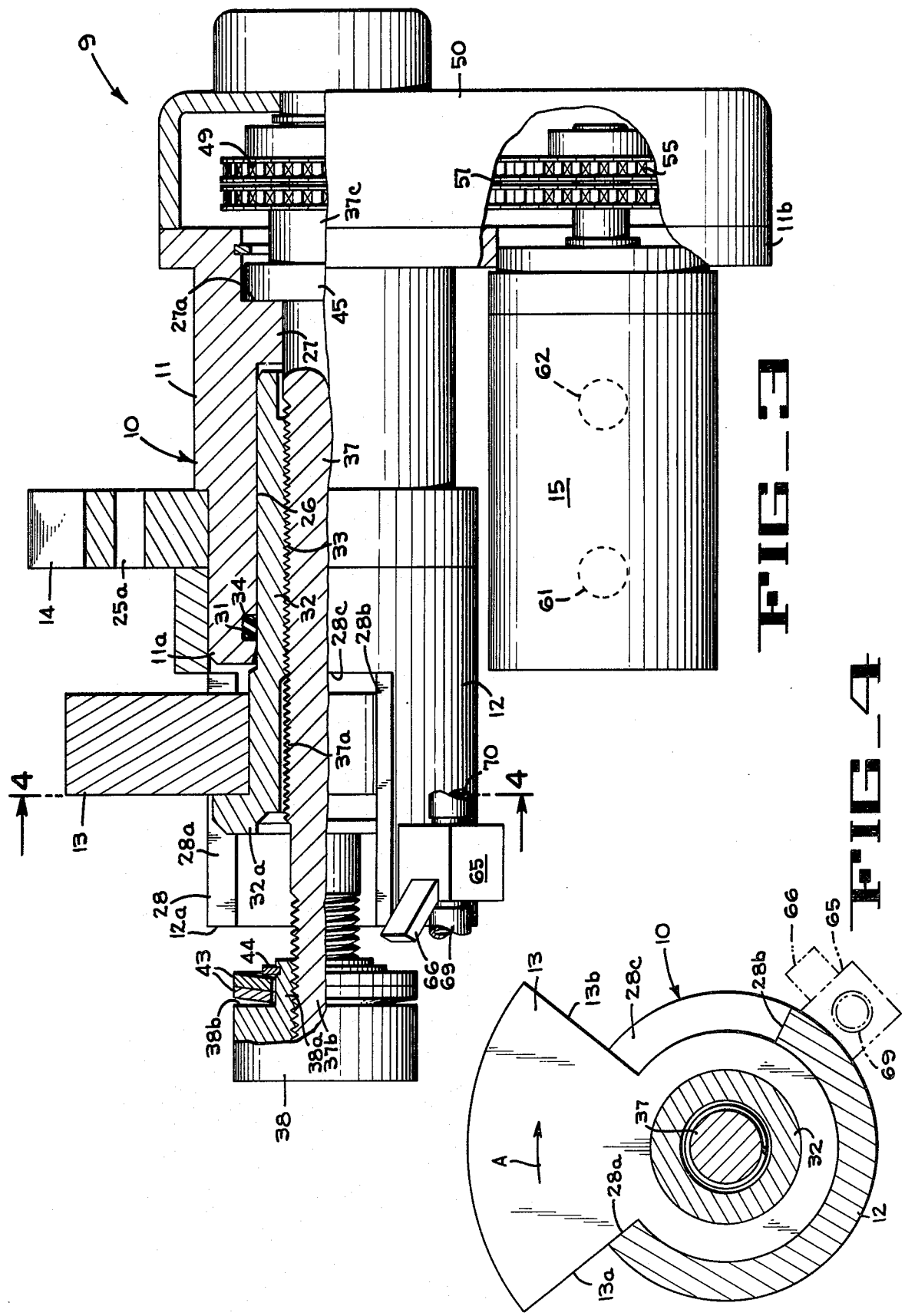

HYDRAULIC COUPLING DEVICE

BACKGROUND OF THE INVENTION

1. Field of the Invention

The present invention relates to fluid handling apparatus, and more particularly to a hydraulic coupling device for drawing and connecting two pipe flanges together.

2. Description of the Prior Art

Various types of fluid transferring devices are used in conveying fluids between a dock, buoy or floating barge and a marine tanker or other transport vessel. Some of the devices which are used in loading and unloading fluids between a dock and a marine tanker include large articulated pipe sections, referred to as marine loading arms, which may be maneuvered by power apparatus to conveniently connect the storage container on the dock to a manifold of the marine tanker. The end of the marine loading arm includes a flange which must be maneuvered into place adjacent a similar flange on the manifold of the marine tanker. The final alignment of the two flanges is usually accomplished by pushing, pulling and/or twisting the flanges into alignment by hand and then using bolts to secure the flanges in a fluid-tight connection. This process is slow, time consuming, and may require a large crew to move the large connectors into place.

Some prior art devices use bolts that are placed through holes in the flanges and tigntened to complete the connection, and sometimes the bolts and their nuts fall and are lost. Other prior art devices use a pair of clamps, each connected to a corresponding one of the flanges, to pull the flanges together. A threaded spindle is rotatably mounted in one of the clamps and is in screw engagement with the other clamp. A wrench may be used to rotate the threaded spindle and thereby pull the flanges into alignment. These devices occasionally are hard to handle, and the coupling process is time consuming. It is also possible that one of the clamps may fall and become lost if portions of the clamps become separated.

SUMMARY OF THE INVENTION

The present invention comprises a power-operated coupling device for drawing and connecting two pipe flanges together, the device generally comprising a body member with a lengthwise bore, a fixed clamp member with means for securing the coupling device to a first one of the flanges, a sleeve slidably mounted in the bore of the body member, power means for selectively moving the sleeve lengthwise in the body member bore, a movable clamp mounted on the sleeve and having a working surface for contacting the other flange, and means for causing the movable clamp to be swung between "closed" or clamping and "open" or non-clamping positions. In the "closed" or clamping position the movable clamp is located to contact a second one of the flanges so that the two flanges may be pulled toward each other. In the "open" or non-clamping position the movable clamp is located out of the way of the flanges so that the second flange can be disengaged from the first flange. A reversible hydraulic motor provides power for moving the sleeve and the movable clamp to draw the flanges together. The movable clamp and sleeve are securely fastened to the body member, thus preventing parts of the device from becoming separated and possibly lost.

BRIEF DESCRIPTION OF THE DRAWINGS

FIG. 1 is a side elevation of a pair of coupling devices of the present invention installed on a fluid loading arm for coupling this arm to a manifold of a marine barge or tanker.

FIG. 2 is an enlarged perspective view of one of the coupling devices of FIG. 1.

FIG. 3 is an enlarged side elevation of the coupling device of FIG. 2, with portions broken away.

FIG. 4 is a fragmentary section taken along line 4—4 of FIG. 3.

DESCRIPTION OF THE PREFERRED EMBODIMENT

As seen best in FIGS. 1, 2 and 3, a coupling device 9 for drawing two pipe flanges together in accordance with the present invention comprises a generally tubular body 10 with inner and outer members 11 and 12 respectively, a pair of opposed clamps 13 and 14, and a reversible hydraulic motor 15. The clamp 14 is welded or otherwise fixed to the inner and outer body members 11, 12 and thus is stationary therewith, whereas the clamp 13 is movable along the length of the body 10 between the clamp 14 and a location adjacent the left or outer end 12a of the outer body member 12. As shown in FIG. 1, two or more of the coupling devices 9 can be used to draw and connect together a pair of flanges 17 and 18 with the number of devices needed being determined by the size of the pipes being used, i.e., smaller diameter pipes may require only two of the coupling devices, while a greater number of coupling devices may be required for larger diameter pipes. In the illustrated use the flange 18 is connected to the outer end of the marine loading arm or other supply pipe 20 extending from a source of fluid (not shown), while the flange 17 is connected to a manifold pipe 21 which conducts fluid to the hold of a marine barge or tanker 22 or other storage or transportation facility. The coupling device 9 is fastened to the flange 18 (FIG. 1) by a plurality of bolts 25 which extend through a plurality of holes 25a (FIG. 2) in the fixed clamp 14.

Details of the coupling device 9 can best be seen in FIGS. 2–4. The inner body member 11 (FIG. 3) includes an axial bore 26 extending from its outer or left end 11a to an inner radial flange 27. A longitudinal slot or lateral opening 28 (FIG. 2), defined by a pair of axial surfaces 28a, 28b and a radial end surface 28c extends along the outer body member 12 from its outer or left end 12a towards the fixed clamp member 14. Centered in the bore 26 is a sleeve 32 having a threaded axial bore 33. The left end of the sleeve 32 (FIGS. 2,3) includes an annular radial flange 32a to which the clamp 13 is welded or otherwise secured in a fixed manner. An annular sealing ring 34 (FIG. 3), residing in an annular groove 31 near the outer end 11a of the body member 11, provides a seal to prevent dirt and water from getting into the space between the sleeve 32 and the bore 26.

An annular rotatable spindle 37 (FIG. 3), having a threaded central portion 37a in screw engagement with the threaded bore 33 of the sleeve 32, extends through the center of the sleeve 32 and projects beyond both ends of the body 10. A retaining nut 38 having a reduced axial portion 38a and a shoulder portion 38b, is threaded onto the left or outer end 37b of the spindle 37. Annular spring washers 43 surround the portion 38a of the nut 38 and are retained thereon by a snap ring 44 that resides in an annular groove 39. The washers 43 provide a resilient stop means for the sleeve 32.

Near its other or inner end portion 37c the spindle 37 includes an annular radial flange 45 that bears against a radial surface 27a of the body flange 27, so that the spindle 37 cannot move axially towards the outer end 12a of the body member 12. Non-rotatably secured to the spindle's inner end portion 37c is a sprocket 49 interconnected by means of a suitable chain 57 to a drive sprocket 55 of the reversible hydraulic motor 15. The motor 15 is mounted on a lateral extension 11b of the body member 11, and a removable protective cover 50 that encloses the sprockets and chain functions to prevent entry of dust, dirt, and other undesirable compositions.

Power to operate the motor 15 is provided by hydraulic lines (not shown) that are connected to a pair of input/output ports 61 and 62 on the motor 15 (FIG. 3). When the hydraulic fluid under pressure enters the port 61 the motor rotates in one direction and fluid is discharged from the port 62, and when hydraulic fluid under pressure is admitted through port 62 the motor rotates in the opposite direction and fluid is discharged from the port 61.

A one-way hydraulic bypass switch 65, having a switch lever 66 and a pair of fluid input/output ports 69, 70, is mounted on the body member 12 near its outer end 12a. The ports 69, 70 are connected to the respective ports 61, 62 of the motor 15 by a pair of hydraulic hoses (not shown). When the spindle 37 is rotated clockwise, i.e., in the direction of the arrow in A in FIGS. 2 and 4, the movable clamp 13 and the sleeve 32 are moved axially away from the fixed clamp 14 until the flange 32a of the sleeve 32 contacts the spring washers 43. During this rotation of the spindle 37 the clamp 13 also rotates clockwise until its lateral surface 13b contacts the slot surface 28b and as the clamp 13 then moves towards the nut 38 it presses against the switch lever 66, causing the switch 65 to open. The open switch 65 bypasses the hydraulic fluid around the motor 15, thereby de-energizing the motor and preventing further clockwise rotation of the spindle 37. The bypass switch 65 prevents the motor 15 from forcing the sleeve flange 32a too tightly against the washers 43 where the motor might not be able to loosen it when the motor is reversed to move the clamp 13 toward the fixed clamp 14. This bypass system also prevents possible damage to the hydraulic motor 15, and of course to the coupling device 9.

Accordingly, by operation of the motor 15 the movable clamp 13 can be moved axially between an "inner" position such as illustrated in FIGS. 2 and 3, and an "outer" position such as illustrated in FIG. 1. Furthermore, the movable clamp 13 also can be pivoted laterally between an "open" position wherein its side surface 13b is in contact with the longitudinal slot surface 28b of the body member 12, as shown by the solid lines in FIG. 2, and a "closed" position wherein the clamp's side surface 13a is in contact with the longitudinal slot surface 28a, as shown in FIGS. 1, 3 and 4, and also by the phantom lines in FIG. 2. When the movable clamp 13 is in its "closed" position it is aligned with the fixed clamp 14, and in this position the flanges 17 and 18 may be drawn together and coupled into a fluid-tight connection. When the movable clamp 13 is in its "open" position, the flanges 17 and 18 can be easily uncoupled.

OPERATION

The procedure for using one or more coupling devices 9 to connect a marine loading arm and a tanker manifold together in fluid-tight fashion is generally as follows. The motor 15 is actuated to rotate the spindle 37 in the direction of the arrow A in FIG. 4, thereby rotating the clamp 13 into its "open" position and moving it away from the fixed clamp 14 towards the spindle nut 38. The flanges 17 and 18 are aligned and brought into fairly close proximity as illustrated in FIG. 1 by operation of the loading arm or by other suitable means, and the motor 15 is then actuated in the reverse direction. This causes the clamp 13 to pivot into its "closed" position, as shown in FIG. 1, and to move axially toward the fixed clamp 14. This axial movement of the clamp 13 continues until the flanges 17 and 18 are gripped and held together in a fluid-tight relation by the clamps 13 and 14, at which time the coupling operation is complete.

The procedure for uncoupling the flanges 17, 18 involves actuating the motor 15 to rotate the spindle 37 in the direction opposite that of arrow A. As this is done, the clamp 13 moves away from the fixed clamp 14 and pivots back into its "open" position, thereby releasing the grip exerted by the coupling device on the flanges and allowing them to be disengaged and the loading arm returned to its stowed position (not shown).

From the foregoing it can be seen that the present invention provides an improved coupling device for quickly and easily coupling together two pipes or other conduits into a fluid-tight condition, and then just as quickly and easily uncoupling the pipes or conduits, all with a minimum of procedural steps and equipment. The hydraulic motor provides power for opening and closing the movable clamp 13, and also for drawing the two flanges 17, 18 together into a fluid-tight connection, and these steps are accomplished without having to go through a series of motor control steps or other relatively complex procedures. Furthermore, since the movable clamp 13 and the fixed clamp 14 are always connected to the body 10 of the coupling device 9, there is no problem of separating and possibly losing some parts of the device.

Although the best mode contemplated for carrying out the present invention has been herein shown and described, it will be apparent that modification and variation may be made without departing from what is regarded to be the subject matter of the invention.

What is claimed is:

1. A coupling device for drawing two flanges together, said device comprising:
    a body member having an axial bore open at one end and having a thrust bearing at the other end;
    a sleeve slidably mounted in said bore of said body member, said sleeve having an axial bore with an inner screw thread in said axial bore;
    an annular spindle having an enlarged portion at each end thereof and an outer screw thread on the portion of the spindle between said enlarged portions, a first of said enlarged portions being rotatably mounted in said thrust bearing of said body member, said outer screw thread portion of said spindle being mounted in screw engagement with said inner screw thread of said sleeve;
    a means for securing said body member to the first one of said flanges;

movable clamp means mounted on said sleeve and having a working surface for contacting the second one of said flanges;

a resilient stop means;

means for mounting said stop means between said sleeve and said second enlarged end of said spindle; and power means for selectively rotating said spindle to thereby cause said clamp means and said sleeve to slide axially along said bore of said body member and for pivoting said clamp means between first and second positions, wherein in said first position said clamp means is located to contact said second flange when said first and said second flanges are axially aligned, and in said second position said clamp means is located aside from said axial alignment.

2. A coupling device as defined in claim 1 including means for swinging said movable clamp means into said first position each time said movable clamp means starts its travel away from said stop means toward said first flange.

3. A coupling device as defined in claim 1 including a limit switch for disabling said power means when said sleeve is moved to a predetermined position.

4. A coupling device as defined in claim 1 wherein said power means for rotating said spindle includes a reversible hydraulic motor and means for coupling said motor to said spindle.

5. A coupling device as defined in claim 1 wherein said body member includes a lateral opening to said bore of said body member, said lateral opening being defined by a pair of edges extending parallel to the axis of said bore, and mounting means extending from said movable clamp through said lateral opening to said sleeve.

6. A coupling device as defined in claim 1 wherein said stop means includes means for limiting the axial travel of said movable clamp means as it moves away from said first flange, and means for swinging said movable clamp means into said second position when said clamp means contacts said stop means.

7. A coupling device for drawing two flanges together, said device comprising:

a body member having an axial bore open at one end and having a thrust bearing at the other end;

a sleeve slidably mounted in said bore of said body member, said sleeve having an axial bore with an inner screw thread in said axial bore;

an annular spindle having an enlarged portion at each end thereof and an outer screw thread on the portion of the spindle between said enlarged portions, a first of said enlarged portions being rotatably mounted in said thrust bearing of said body member, said outer screw thread portion of said spindle being mounted in screw engagement with said inner screw thread of said sleeve;

a means for securing said body member to the first one of said flanges;

movable clamp means mounted on said sleeve and having a working surface for contacting the second one of said flanges;

power means for selectively rotating said spindle to thereby cause said clamp means and said sleeve to slide axially along said bore of said body member and for pivoting said clamp means between first and second positions, wherein in said first position said clamp means is located to contact said second flange when said first and said second flanges are axially aligned, and in said second position said clamp means is located aside from said axial alignment;

a hydraulic limit switch, and means for mounting said limit switch adjacent said second enlarged end of said spindle in the travel path of said movable clamp, said movable clamp activating said limit switch as said movable clamp moves against second enlarged end of said spindle, the activated limit switch disabling said motor.

* * * * *